United States Patent
Hart, Jr. et al.

[11] Patent Number: 6,130,706
[45] Date of Patent: Oct. 10, 2000

[54] PROCESS FOR DETERMINING VEHICLE DYNAMICS

[75] Inventors: Arthur Clifford Hart, Jr., Chester; Matthew A. Kordys, Flanders; Vishvjit Singh Nalwa, Middletown; Sarma VGK Pingali, Basking Ridge, all of N.J.

[73] Assignee: Lucent Technologies Inc., Murray Hill, N.J.

[21] Appl. No.: 09/149,372

[22] Filed: Sep. 8, 1998

Related U.S. Application Data

[60] Provisional application No. 60/079,321, Mar. 25, 1998.
[51] Int. Cl.$^7$ ....................................... H04N 7/18
[52] U.S. Cl. .................... 348/148; 364/484; 364/485; 364/605; 364/551.01; 395/905; 395/913
[58] Field of Search ............................. 348/148; 340/439, 340/576; 364/559, 424, 905, 913; 303/111

[56] References Cited

U.S. PATENT DOCUMENTS

| | | |
|---|---|---|
| 5,379,353 | 1/1995 | Hasegawa et al. . |
| 5,579,245 | 11/1996 | Kato . |
| 5,717,606 | 2/1998 | Hara et al. ............................. 340/439 |

FOREIGN PATENT DOCUMENTS

| | | |
|---|---|---|
| 05079850 | 9/1991 | Japan . |
| 1408078A | 10/1975 | United Kingdom . |

OTHER PUBLICATIONS

Dr. –Ing, An Optical Correlation Method for the Direct Measurement of Transient Sideslip and Slip Angles of Motor Vehicles, ATZ Automobil technische, Jul. 8, 1975.

*Primary Examiner*—Chris S. Kelley
*Assistant Examiner*—Shawn S. An
*Attorney, Agent, or Firm*—SCott J. Rittman

[57] ABSTRACT

A process for determining at least one dynamic of a vehicle, particularly slip angle, during travel. The process involves optically monitoring, in real time and from the vehicle itself, the movement in one or more camera images of surface features as the vehicle passes over the surface. The direction in which the surface features are moving at any given time indicates the actual direction of vehicle movement with respect to the orientation of the optical monitoring equipment. From this actual direction of movement, in combination with the known orientation of the optical monitoring equipment and the direction in which the vehicle is being steered, it is possible to calculate the slip angle in real time.

20 Claims, 6 Drawing Sheets

| a | b | c |
|---|---|---|
| d | e | f |
| g | h | i |

PROCESS FOR DETERMINING VEHICLE DYNAMICS

CROSS-REFERENCE TO RELATED APPLICATIONS

This application claims priority of Provisional Application Ser. No. 60/079,321 which was filed on Mar. 25, 1998.

BACKGROUND OF THE INVENTION

1. Field of the Invention

The invention relates to a process for determining dynamic properties of a vehicle, in particular the slip angle of an automobile.

2. Discussion of the Related Art

Automobile racing teams are interested in measuring a variety of vehicle dynamics in order to improve their vehicles' performance. Specifically, racing teams adjust numerous parameters of their vehicles depending on the characteristics of a particular track, e.g., the sloping of a track's curves and the track surface. In fact, many race teams use advanced computer systems to design and make adjustments to their vehicles. See, e.g., *Computer Aided Engineering*, Vol. 10, No. 5, May 1991, at 20, which provides an overview of the computer-aided design systems used by race teams. The systems typically rely on inputting numerous vehicle and track variables to determine the best combination of vehicle characteristics for increased speed and stability.

Figure 1:
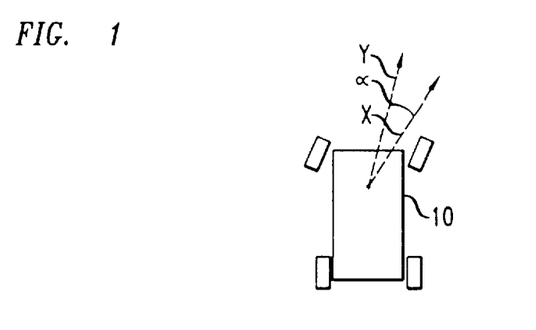
FIG. 1 illustrates the slip angle of a vehicle.

One such vehicle characteristic is tires. The tires used on a race car are varied depending on individual track characteristics. In fact, four tires of different properties will typically be used on a single race car. One travel property that significantly affects tire choice is slip angle. As reflected in FIG. 1, which is a top view of a vehicle 10, slip angle is defined as the angle ($\alpha$) between the direction the driver is steering (ray X) and the direction the vehicle is traveling (ray Y). Slip angle is a well-known phenomenon, and is discussed, for example, in Milliken et al., *Race Car Vehicle Dynamics*, SAE International, 1995, the disclosure of which is hereby incorporated by reference. For a particular vehicle and particular tires, individual race tracks will induce different slip angles around the tracks' curves. In fact, since the individual wheels of a race car are typically designed to steer in differing directions during a turn, each wheel may exhibit a different slip angle. Depending on the calculated slip angle, a race team normally adjusts the tire properties, e.g., tread, material, width, diameter, construction, and pressure, to attain a slip angle that provides improved vehicle performance. For this reason, a relatively simple, reliable, real-time measurement of slip angle is desirable.

However, current systems for determining properties such as slip angle are typically complicated, and depend on several distinct sensing devices feeding information to a microprocessor, which then estimates several travel properties, including slip angle. Most of these complex systems were developed by automobile manufacturers in introducing and improving safety systems such as anti-lock brakes and traction control. For such safety systems, the manufacturers are typically interested in sensing and/or calculating a variety of parameters, e.g., yaw (degree of turn about the vertical axis), lateral (side-to-side) acceleration, longitudinal (front-to-back) acceleration, steering angle, and slip angle. These parameters allow adjustments in steering, acceleration, or braking to be quickly and automatically made to control an automobile's motion, e.g., control a skid. See, for example, U.S. Pat. Nos. 4,679,808 ("the '808 patent"), 5,040,115 ("the '115 patent"), and 5,579,245 ("the '245 patent"), all of which use a variety of measured properties to calculate a slip angle value.

The '808 patent discusses a system for determining front and/or rear wheel steering angles necessary to provide desired cornering characteristics. A system described in the patent contains a steering wheel angle sensor, a vehicle speed sensor, a sensor for determining a first motion variable such as yaw rate, a sensor for determining a second motion variable such as yaw acceleration, and a microprocessor. The microprocessor calculates estimated values of the first and second motion variables based on a mathematical vehicle model, on the steering angle and vehicle speed, and on certain vehicle characteristics. In some circumstances, adjustments to the measured first and second motion variables are made based on these estimated values. Then, a third motion variable, such as slip angle, is estimated based on the first and second motion variables and the measured speed and steering angle. The '115 patent similarly measures several properties and inputs the properties to a microprocessor, which then calculates an estimated slip angle based on the inputted data. The '115 patent describes one embodiment containing a longitudinal acceleration monitoring unit, a lateral acceleration monitoring unit, a wheel speed sensor, and an arithmetic circuit for receiving the data. The lateral acceleration data is compared to an experimentally derived slip criterion to calculate the slip angle of a vehicle. The '245 patent utilizes a neural network in an attempt to provide an "actual" slip angle value, as opposed to an estimated value calculated from several measured variables. Specifically, the system of the patent measures front wheel steering, the motion of the vehicle, e.g., velocity, lateral and longitudinal acceleration, and yaw angular velocity, and calculates an estimated slip angle value based on the steering and motion data. The neural network calculates a correction factor in order to provide more accurate estimated slip angle value.

While systems such as those discussed above are useful for estimating a property such as slip angle for purposes of making adjustments to braking, steering, and/or acceleration in a passenger car, such systems are unnecessarily complex when the measurement of primary concern is the slip angle. Moreover, the sensors required in such systems typically will not survive the harsh environment of a racing vehicle. Also, in such previous systems, numerous variables, e.g., lateral acceleration, longitudinal acceleration, and lateral yaw, are relied upon to calculate slip angle, all of which are capable of introducing error into the calculation. Given the number of variables already input into the computer-aided systems used by race teams, a more direct measurement of slip angle would be expected to reduce the overall error introduced into such systems, thereby contributing to improved performance.

Thus, a relatively simple process for reliably and more directly measuring the dynamics of a vehicle, in particular slip angle, is desired.

SUMMARY OF THE INVENTION

The invention is a process for determining at least one dynamic of a vehicle, particularly slip angle or a property characteristic of slip angle, during travel. The process involves optically monitoring, in real time and from the vehicle itself, the movement in one or more camera images of surface features as the vehicle passes over the surface. (Features of a surface indicate optically distinguishable features that contrast with the majority of the surface, e.g., imperfections, discolorations. For example, in an asphalt road surface, various pebbles and stones are found within the asphalt, these pebbles constituting optically distinguishable features in the surface.) The direction in which the surface features are moving at any given time indicates the actual direction of vehicle movement with respect to the orientation of the optical monitoring equipment. From this actual direction of movement, in combination with the known orientation of the optical monitoring equipment and the direction in which the vehicle is being steered, it is possible to calculate the slip angle in real time.

Figure 2A:
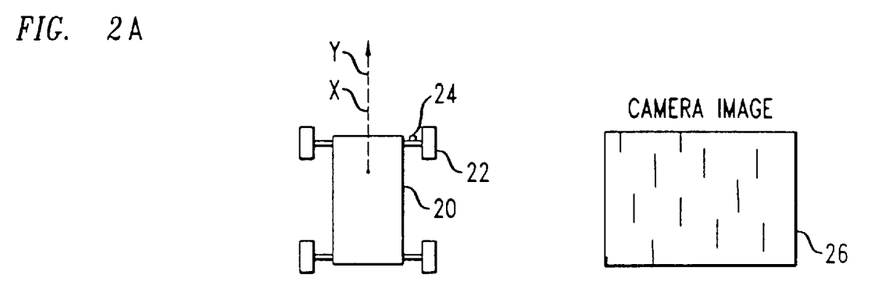
FIGS. 2A and 2B illustrate the fundamentals of one embodiment of the invention.
Figure 2B:
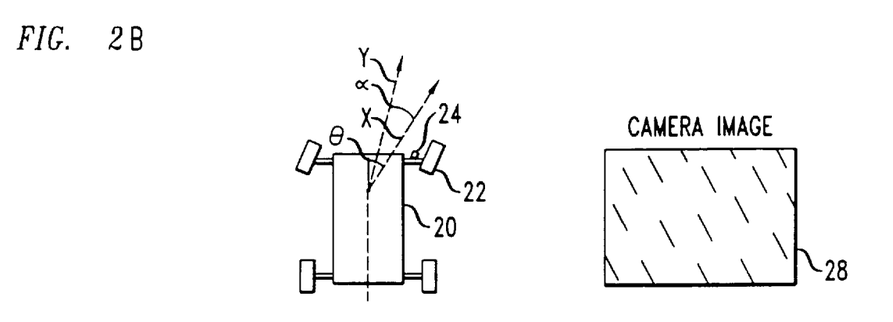

For example, in one embodiment, a video camera is mounted onto a vehicle such that the camera is directed at the ground. (As used herein, camera refers to a video camera, such as a charge-coupled device (CCD) camera or a CMOS camera.) The shutter speed of the camera is set such that the motion of surface features in a single capture interval (i.e., a single shutter opening) form streaks which are large enough to be observed in a single image (i.e., a single frame) yet which are small enough to be substantially contained within that single image (see FIGS. 2A and 2B). When the vehicle is moved straight ahead on a flat surface (assuming the camera is aligned with the wheels), the streaks exist substantially vertically in the aligned camera's image frame (see FIG. 2A). However, as discussed previously, when the wheel is turned during movement, the vehicle does not move exactly in the wheel direction. Thus, during a turn, the streaks in the image frame will not be vertical (see FIG. 2B). As reflected in FIG. 3, the dominant orientation of the streaks is determined, and, based on the angle of dominant orientation and on reference information (e.g., known orientation of the vehicle with respect to the camera), it is possible to calculate the actual slip angle in real-time. The speed is also capable of being determined, from the lengths of the streaks. It is possible for the camera to be mounted on a wheel or the body of the vehicle, or for numerous cameras to be used to improve the accuracy of the measurements and/or calculate the slip angle of individual wheels.

In another embodiment, instead of looking at the streaks in a single camera frame, the location change of individual surface features in two consecutive, closely spaced frames, e.g., separated by about 1000 μs, is monitored to determine the direction of travel. As reflected in FIG. 6, static features are extracted from the individual frames (i.e., distinguished from the rest of the image), and the motion vectors 40 of the features (i.e., both the direction of movement and the speed) are determined. The vectors of individual features are analyzed to determine the dominant motion vector 42. Unfortunately, such high speed cameras are currently expensive and somewhat bulky. Therefore, in a third embodiment, one or more strobe lights are used with a camera, such that short flashes are performed within a single camera frame, e.g., two strobe flashes of about 10 μs within a 1000 μs camera frame. As reflected in FIG. 8, the two sets of individual features are then extracted from this single frame, and a dominant motion vector 54 of the features determined.

The invention thus provides a relatively simple and practical way, compared to previous methods, to more directly and reliably measure slip angle in real-time.

DETAILED DESCRIPTION OF THE INVENTION

In a first embodiment of the invention, the texture associated with the movement (e.g., streaking) of surface features within a single camera frame is analyzed to determine vehicle dynamics, in particular slip angle. A general discussion of texture analysis is found in A. Ravishankar Rao, A Taxonomy for Texture Description and Identification, Springer-Verlag Publishers, New York, 1990, the disclosure of which is hereby incorporated by reference. Generally, the shutter speed is set based on the following relationship. For a given field of view of the camera, l, as measured on the ground plane along the direction parallel to the steering direction (assuming the camera is oriented such that it moves along with a wheel) and a vehicle velocity, v, the shutter exposure time, $t_s$, is advantageously:

$$\frac{l}{2v} < t_s < \frac{l}{v}$$

Typically, the shutter speed, $t_s$, is set at about $$0.75\left(\frac{l}{v}\right).$$

For example, the frame is typically obtained by exposure for a time of (i.e., a shutter speed of) about 4 ms to about 1 ms, for vehicle speeds of about 100 mph or greater. The preferred viewing direction for a camera in the process of the invention is orthogonal to the ground surface, such that the image plane is parallel to the ground surface.

Figure 3:
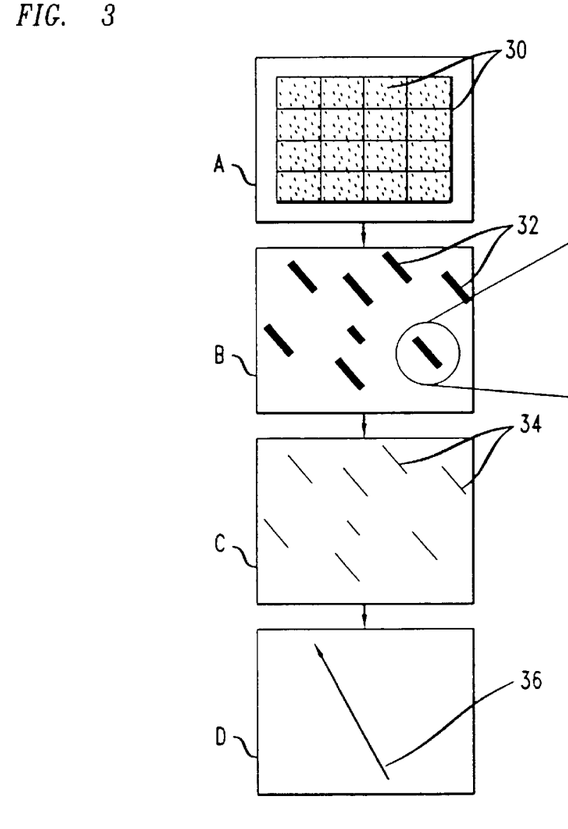
FIGS. 3 and 3A illustrate the analysis performed in one embodiment of the invention.

FIG. 3 outlines a method for determining slip angle from the texture of a road surface image, in accordance with a first embodiment of the invention. As shown in Box A, regions of interest (ROIs) 30 in a single captured image are selected for further processing. Real-time processing constraints are satisfied by focusing processing on these regions of interest (ROIs). For example, it is possible to choose the number of ROIs analyzed based on the processing time available. Similarly, it is possible to choose the size of the ROIs based on the expected feature motion in the images, e.g., such that a streak is captured in a single ROI. It is also possible for the number of ROIs that are processed in an image to be dynamically varied to satisfy real-time constraints. The ROIs also allow the determination of direction of motion of road features locally in different parts of the image.

Figure 3A:
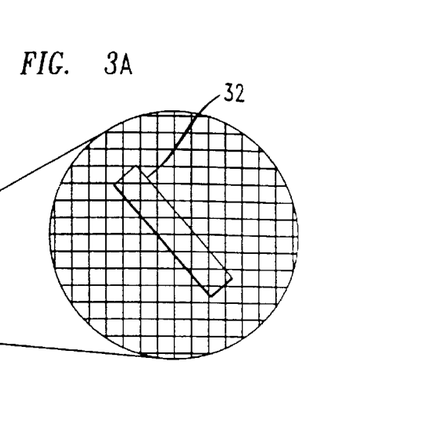
Figure 4:
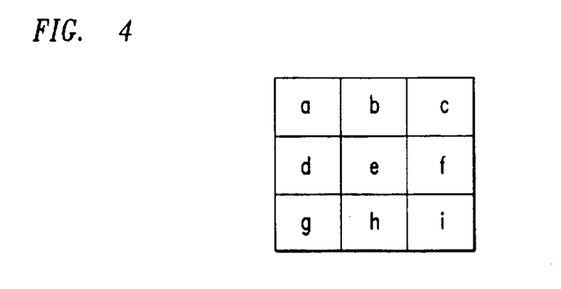
FIG. 4 illustrates a template capable of being used in the analysis of FIG. 3.

Once the ROIs are chosen, processing is performed within each ROI, as reflected in Box B of FIG. 3, to identify any streaks 32 indicative of features on the road surface. To identify these streaks electronically, edges or points of high image intensity gradient are identified in each ROI, these edges or points showing the location of the streaks. (Image intensity indicates the brightness of light incident on the image plane.) High image intensity gradient indicates points where the local change in image intensity values is relatively high. The gradient magnitude is $$\sqrt{(\Delta y)^2 + (\Delta x)^2}$$

and the orientation is $$\tan^{-1}\left(\frac{\Delta y}{\Delta x}\right),$$

where 66 y is the change in intensity in the y direction, and Δx is the change in intensity in the x direction. (Monitoring of intensity is intended to encompass measurement of related properties, e.g., spatial frequency.) Often, the streaks 32 will be thicker than a single pixel, as shown in FIG. 3A. (In the present context, pixel indicates a picture element arising from digitizing an image.) In addition to identifying the location of the streaks, the orientation of the streaks 32 is desired to allow determination of the direction of vehicle motion. To determine the orientation of a streak 32, the streak 32 is converted into a single pixel-thick edge segment by linking edge pixels, e.g., according to the following process, which combines edge pixel detection and linking to save processing time. (Other processes are also possible.) Start at the left lower corner of the ROI.

1) Scan, algorithmically, from current location left to right, bottom to top. Stop if no unmarked pixel (i.e., a pixel that is either not an edge pixel or not yet "seen," as discussed below) is found in the ROI.

2) On encountering an unmarked pixel, determine gradient magnitude and gradient orientation of the unmarked pixel (see below). Mark the current unmarked pixel location as "edge start location" of a new edge segment. Choose this new edge segment to be the current edge segment.

3) If gradient magnitude exceeds a threshold (set based on prior knowledge), mark the current pixel as an edge pixel. Otherwise, mark the current pixel as "seen." Determine the neighboring candidate edge pixel in an 8-pixel neighborhood (a–d and f–i in FIG. 4) based on the gradient orientation of the current pixel, i.e., of the eight neighbors of the current pixel, choose the neighbor closest to the computed gradient orientation of the current pixel. If the neighboring candidate pixel is already marked (as an edge pixel or as seen): end the current edge segment, store the current edge segment, move to the "edge start location," and repeat from step 1.

4) If the neighboring candidate pixel is unmarked, mark remaining unmarked neighboring pixels around the current pixel as "seen," and move to the unmarked neighboring pixel determined in step 3. Repeat from step 2.

The gradient magnitude at a current pixel in step 2 is given by $$S = \sqrt{S_x^2 + S_y^2},$$

while the gradient orientation is given by $$= \tan^{-1}(S_y/S_x),$$

where:

$$S_x = (c + 2f + i) - (a + 2d + g)$$

and $$S_y = (g + 2h + i) - (a + 2b + c)$$

where a,b,c,d,f,g,h,i correspond to the intensity values of the pixels neighboring the current pixel, e, as shown in FIG. 4. Such edge detection methods are discussed, for example, in I. Sobel, "Camera models and machine perception," AIM-21, Stanford AI Lab, May 1970, the disclosure of which is hereby incorporated by reference.

Once edge segments in the ROI are identified, the orientation of each edge segment is estimated by determining the best-fit line to the points on the edge segment. One way to obtain a relatively quick approximation of this best-fit line is as follows. The end points of the edge segment are joined by a straight line 34, as shown in Box C of FIG. 3, and the number of edge segment points that lie close to the line 34 are checked. If a sufficient number of points lie close to the line 34 (e.g., at least 95% of the points lie within 2 pixels of the line), the line 34 is considered to be a good approximation to the edge segment and the orientation of the segment is given by the orientation of the line 34. Otherwise, the edge segment is considered invalid. If most (e.g., about 50% or greater) of the edge segments in an ROI are invalid, the ROI is considered invalid. Otherwise, as shown in Box D of FIG. 3, the dominant orientation 36 within the ROI is estimated from the valid edge segments in the ROI. It is possible to obtain this dominant orientation 36 by first computing a histogram of orientations of edge segments. The peak in the histogram corresponds to the dominant orientation in the ROI, and the actual value is typically computed by a mean weighted sum of orientations of the edge segments whose orientations lie within a small range (e.g., 2° or less) around the peak in the histogram. It is also possible to find the dominant orientation by use of the Hough Transform, as discussed in U.S. Pat. No. 3,069,654. These types of methods for determining dominant orientation are discussed, for example, in V. Nalwa, *A Guided Tour of Computer Vision*, Addison-Wesley (1993). The orientation of each edge segment is weighted by the number of pixels in the segment. If the histogram does not have a distinct peak (i.e., a distinct peak reflecting at least 50% of the pixels within a small window (2° or less) around the peak), the ROI is considered invalid. Similarly, if the dominant orientation of a particular ROI differs significantly from the dominant orientation of the majority of ROIs, the particular ROI is considered invalid. Such invalid ROIs often reflect spurious road features such as road debris.

Once the dominant orientations in valid individual ROI are determined, the global value of the orientation for the entire image is determined by forming a histogram of orientations of valid ROIs, detecting the peak in the histogram, and finding the mean orientation for ROIs whose orientations lie within a small range (e.g., 2° or less) around the peak. This calculation gives the angle of vehicle motion in a coordinate system based on the camera orientation. Finally, it is possible to determine the slip angle by subtracting the computed angle from a reference angle corresponding to motion without slip (i.e., the angle to which the wheel is steered). It is also possible to determine the speed of the vehicle from the lengths of valid edge segments. For example, a dominant edge segment length of valid edge segments is obtained by computing the peak of the histogram of lengths of valid edge segments, and the speed is determined from this dominant edge segment length using the known shutter speed.

Figure 5A:
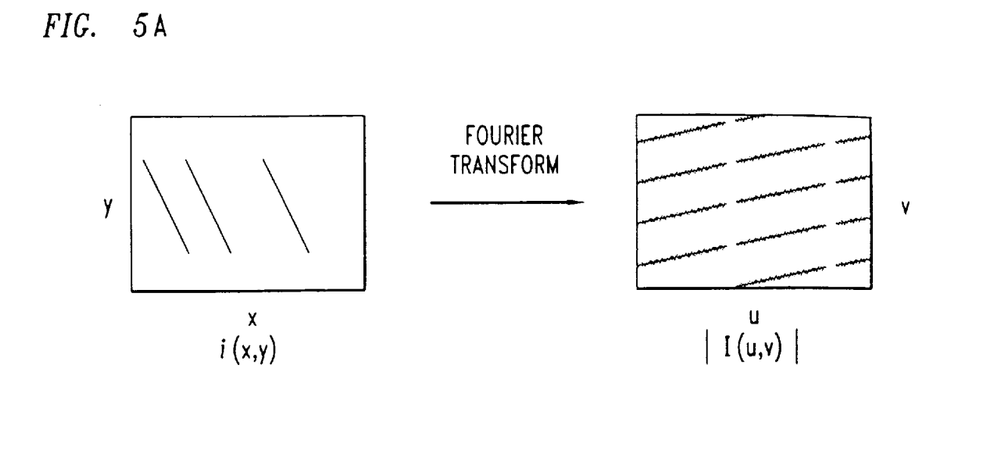
FIGS. 5A and 5B illustrate a global analysis of an image in one embodiment of the invention.
Figure 5B:
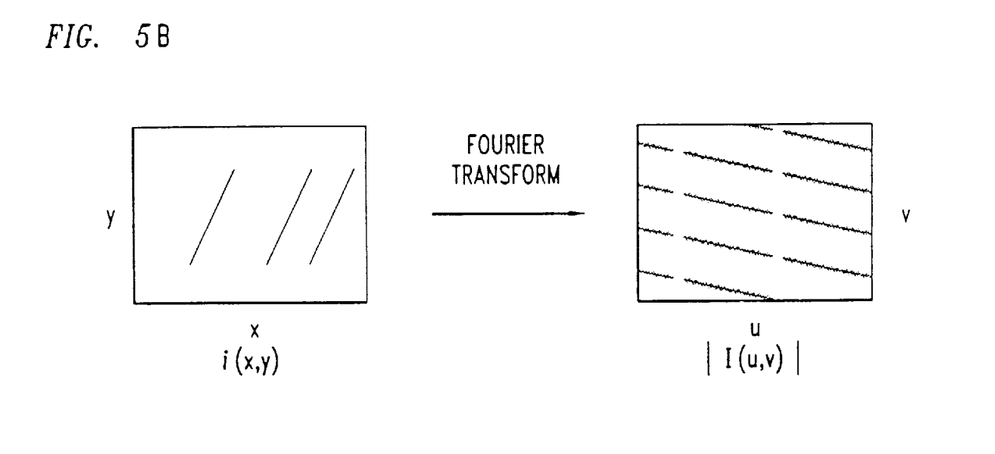

This technique is one way of performing an analysis of the monitored streaks. Other types of analysis which similarly determine the average or dominant motion are also suitable. For example, instead of looking at individual streaks in particular regions of interest, it is possible to analyze the entire image globally. One way to do so is by frequency domain analysis. For example, the Fourier transform of an image converts the image from the spatial domain to an equivalent image in the frequency domain. If the image contains oriented streaks in the spatial domain, the frequency domain image will have a highest integrated magnitude and higher spread along an angle orthogonal to the orientation of the streaks and through the origin in the frequency domain, as illustrated schematically in FIGS. 5A and 5B. This technique is essentially equivalent to finding the direction in which the image's autocorrelation is a maximum.

The orientation ($\hat{\theta}$) of the streaks is obtained from:
$\hat{\theta}=90°-\hat{\phi}$, where $\phi$ is the orientation along which the magnitude is greatest in the Fourier domain. The image in the Fourier domain, I(u,υ), is capable of being expressed as I ($\omega$,), where u=$\omega$cos and υ=$\omega$ sin. An orientation projection function, H(), is then computed along different orientations in the frequency domain, where $$H(\phi) = \sum_{\omega_{min}}^{\omega_{max}} |I(\omega, \phi)|.$$

The angle $\hat{\phi}$ for which H() is greatest determines the orientation ($\hat{\theta}$) of the streaks in the image, according to $\hat{\theta}=90°-\hat{\phi}$. (In addition, in such a frequency domain analysis, if the bounds on the slip angle and the orientation of the camera with respect to the steering direction are known, it is possible to ease processing by restricting the analysis to a range of orientations, i.e., $|\phi_{max}|<\phi<|\phi_{min}|$, where $_{max}$ and $_{min}$ are, respectively, the maximum and minimum slip angles expected.) Similar global frequency analyses will be apparent to those skilled in the art.

Figures 6, 6A, 6B:
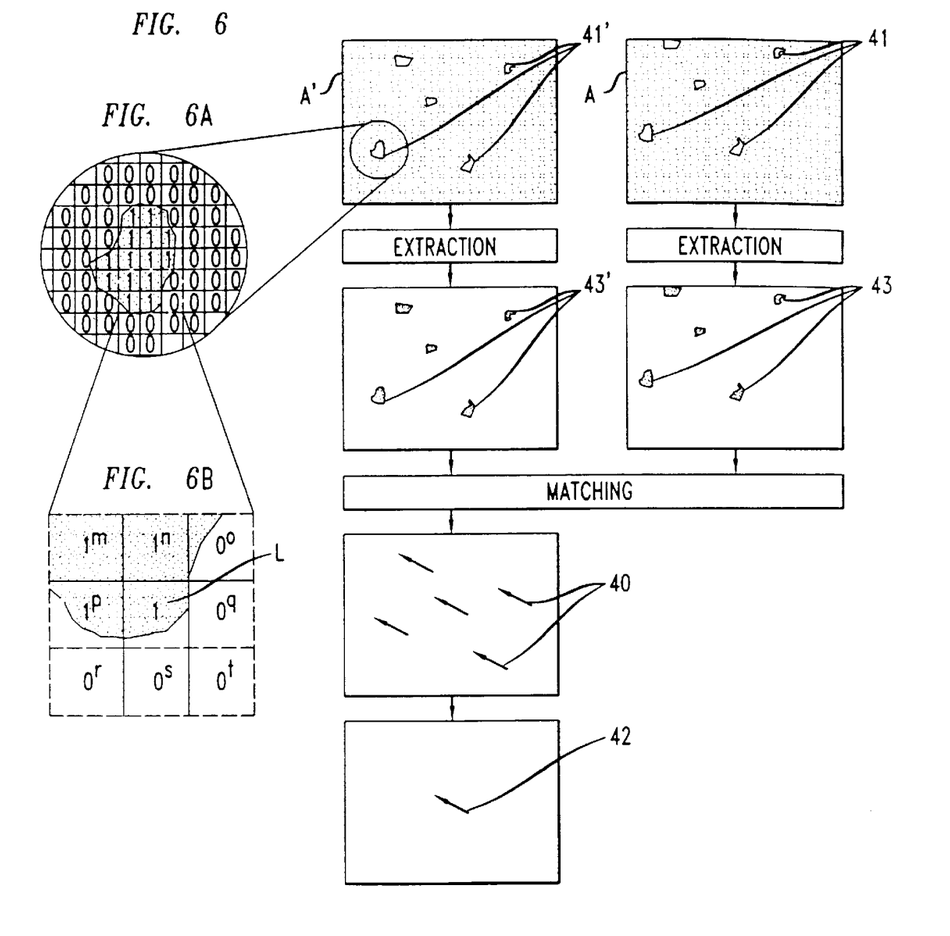
FIGS. 6, 6A, and 6B illustrate the analysis performed in another embodiment of the invention.

In a second embodiment, the movement, i.e., location change, of individual surface features in consecutive, closely spaced frames, e.g., separated by about 0.25 ms to about 1 ms, is monitored to determine the direction of travel, and optionally the speed. Typically, two consecutive frames are analyzed, although it is also possible to analyze three or more frames. In addition, consecutive frames are typically needed to analyze the location change of individual features, but, it is also possible to skip frames if such a location change is still able to be monitored. FIG. 6 illustrates the steps involved in determining velocity according to this embodiment. Images are captured in consecutive frames A, A' using a relatively high-speed, e.g., a shutter speed of about 10 μs or faster, for vehicle speeds of 100 mph or greater. The shutter speed is advantageously less than $$\frac{l}{vn},$$

where l is the field of view (measured on the ground plane) along the direction parallel to the steering direction, n is the number of pixels in the image plane along this same direction, and v is the speed of the vehicle (again assuming the camera is oriented such that it moves along with a wheel). Static features 41, 41' are then extracted from the individual frames A, A'. The extracted features 43 of the first frame A are matched to their location 43' in the consecutive frame A', and the motion vectors 40 (i.e., vectors indicating both speed and direction) of the matched features are determined. A dominant motion vector 42 is calculated by averaging the motion vectors 40 of the individual surface features. From the dominant motion vector 42, camera calibration information is used to determine the angle of motion of the surface in a coordinate system associated with the camera, and the vehicle speed is also capable of being determined. The slip angle is calculated by subtracting the computed angle of motion from a reference angle corresponding to motion without slip (i.e., the steering direction).

It is possible to perform the extraction of the individual features 41, 41' in consecutive frames by a variety of techniques, including thresholding, which is discussed, for example, in U.S. patent application Ser. No. 08/586012, the disclosure of which is hereby incorporated by reference. For example, regions of high intensity in a frame are found by thresholding the intensity values in the image. Thresholding refers to retaining pixels having intensity values greater than a certain selected threshold value, e.g., 80%, of a maximum intensity value. (Maximum intensity value is typically either a preselected value or is selected based on the particular frame being analyzed.) Specifically, in one embodiment, pixels with intensity greater than this threshold are assigned a value 1 and the remaining pixels are assigned a value 0. (See FIG. 6A, in which the square regions represent pixels.) Pixels with a value 1 are then grouped in regions as follows. (See FIG. 6B, a close-up view of a portion of FIG. 5A. The square regions in FIG. 6B represent pixels.)

1) Give the current pixel a unique region label, L;
2) Determine if any of the current pixel's neighboring pixels (m,n,o,p,q,r,s,t) have a value 1;
3) If no neighboring pixels have a value 1, stop;
4) For each neighbor with value 1, repeat from step (1).

This process groups neighboring pixels into regions of pixels having a value of 1. Regions with too few pixels of value 1, e.g., less than 5, are typically discarded. The resultant electronic pixel groupings constitute extracted features 43, 43' illustrative of road surface features.

Matching is typically performed by searching in a frame for an extracted feature having characteristics similar to another extracted feature. Such similarity is typically determined by the intensity characteristics of surface features, the feature size, and/or the feature contours. For example, for each extracted region in a frame, at location x,y, search in a neighborhood (Nx, Ny) of x,y in the consecutive frame for matching regions. The measure of match between any two regions is given by d=ΔA+Δ$I_{m+}$Δe, where ΔA is the difference in area of the two regions (in terms of number of pixels), Δ$I_m$ is the difference in mean intensity of pixels in the two regions, and Δe is the difference in the eccentricities of the two regions. (As known in the art, eccentricity is the ratio of maximum chord A in a region to the maximum chord B perpendicular to A within the same region.) The best matching region in the consecutive frame is the one for which d is smallest. (See also the discussion of extraction and matching in U.S. patent application Ser. No. 08/586012 (referenced previously.)

The motion vector determination is performed using processes such as discussed in Section III of J. Aggarwal and N. Nandhakumar, "On the Computation of Motion from Sequences of Images—A review," *Proceedings of the IEEE*, Vol. 76, No. 8, August 1988, at 917, the disclosure of which is hereby incorporated by reference. The motion vector is typically the line joining the centroids of the matching regions.

In this embodiment, it is possible to use a light source (typically a strobe light or a ring flash) which flashes during the camera exposure. In this manner, an improved image is obtained since smaller camera apertures and exposures are able to be used, thereby increasing the camera's depth of field and reducing its motion blur. To provide desirable illumination, the strobe or flash is advantageously placed as close to the camera as possible, as well as being pointed in the same direction as the camera.

A third embodiment allows use of an analysis similar to the second embodiment, but without the need for such a high-speed camera. Specifically, a camera is used in conjunction with a light source, typically a strobe light, such that strobe flashes are performed, for example, twice within a single camera frame. The typical shutter speed of the camera ranges from 0.25 ms to 2 ms, for vehicle speeds of 100 mph or higher. Generally, the two strobed images are separated by a period ranging from $$\frac{0.25l}{v} \text{ to } \frac{0.75l}{v},$$

where l is the field of view (measured on the ground plane) along the direction parallel to the steering direction and v is the speed of the vehicle (again assuming the camera is oriented such that it moves along with a wheel). Correspondingly, the shutter speed is generally about $$\frac{0.3l}{v} \text{ to } \frac{0.8l}{v}.$$

Figure 7:
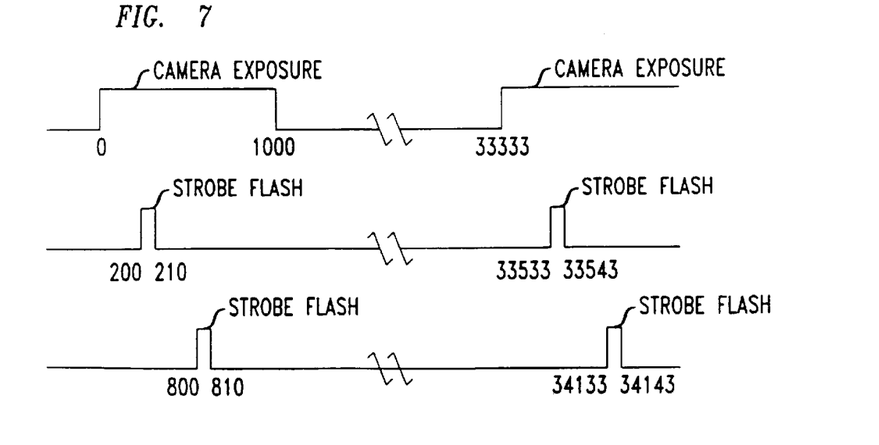
FIG. 7 illustrates the optical measurements performed in a further embodiment of the invention.
Figure 8:
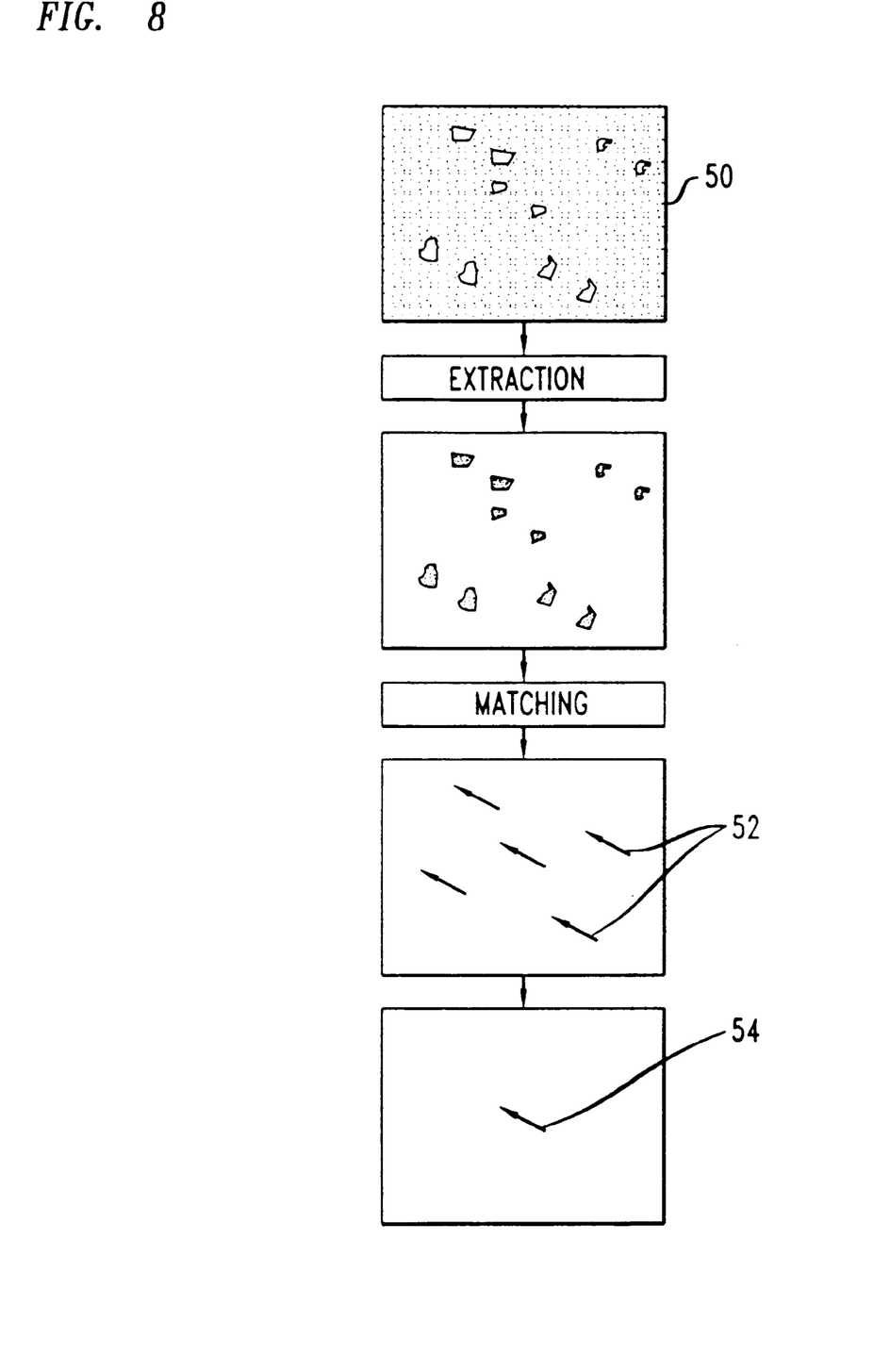
FIG. 8 illustrates the analysis performed in the further embodiment of the invention.

In this embodiment, two overlapping images of the surface at two instants of time are captured in a single frame. See, for example, FIG. 7, which shows a 1000 µs camera exposure beginning at t=0. A first 10 µs strobe flash is performed at t=200, and a second 10 µs strobe flash at t=800. One technique for analyzing the image obtained by this embodiment is illustrated in FIG. 8. The frame 50 contains overlapping images containing individual surface features. The individual surface features are extracted and matched, and motion vectors 52 are determined from the matched features. From the motion vectors 52, a dominant motion vector 54 is calculated, and, as discussed previously, from the dominant motion vector 54, the angle of motion of the surface in a coordinate system associated with the camera is determined, along with vehicle speed. The slip angle is calculated as discussed previously. The extraction, matching, and determination of individual and dominant motion vectors are performed as discussed in the previous embodiment. Some blurring typically occurs in this embodiment due to the overlap of the images, as compared to the previous embodiment in which consecutive frames are analyzed, but the blurring occurs to a lower extent than in a typical continuous exposure of 1000 µs or more.

Figure 9:
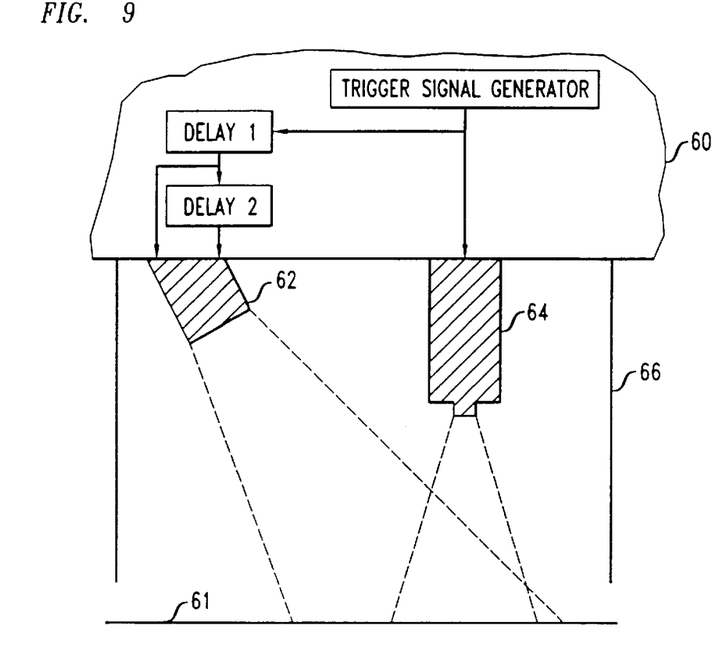
FIGS. 9 and 10 illustrate apparatus suitable for use in performing the further embodiment of the invention.
Figure 10:
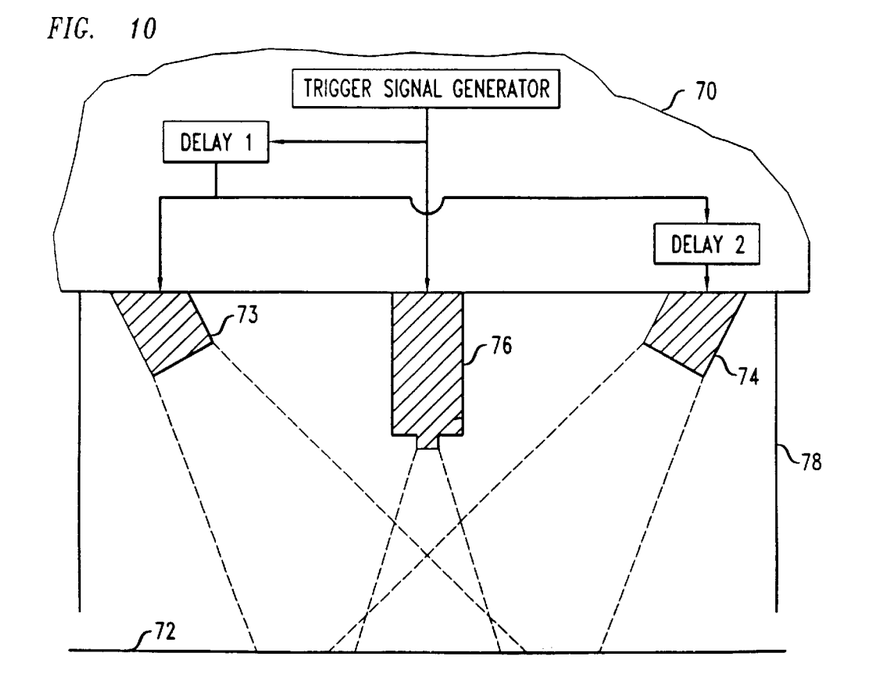

Apparatus suitable for performing this third embodiment are shown in FIGS. 9 and 10. FIG. 9 shows an apparatus mounted to a vehicle 60 passing over surface 61. The apparatus contains a single strobe light 62 in combination with a camera 64. A signal from a trigger signal generator opens the camera's 64 shutter, while the signal enters a first delay before triggering a first strobe flash, and then a second delay before triggering a second strobe flash. The shutter closes, and the process repeats, e.g., according to the timeline shown in FIG. 7. The shading tube 66 shown in FIG. 9 is optionally included to allow the strobe flash to be the dominant light source over the camera's field of view.

FIG. 10 shows an apparatus mounted to vehicle 70, passing over surface 72. The apparatus contains two strobe lights 73, 74 in combination with a camera 76. A signal from a trigger signal generator opens the camera's 76 shutter, while the signal enters a first delay before triggering a first strobe flash from the first strobe light 73, and then a second delay before triggering a second strobe flash from the second strobe light 74. The shutter closes, and the process repeats, e.g., according to the time-line of FIG. 7. As in FIG. 9, a shading tube 78 is optionally used. The use of two strobe light sources, as opposed to a single source, allows each source to provide flashes with larger delays between them.

In the process of the invention, the set-up and attachment of cameras, strobe lights, and associated equipment are typically specific to individual vehicles. The structure of a vehicle determines in part where the equipment is capable of being located. Vehicle features such as aerodynamics and vibration are also considered. Desirable arrangements of equipment are easily ascertained by those familiar with vehicles and camera equipment.

For example, as to camera equipment, typical NTSC cameras with interlaced scans have a field of approximately 240 rows (vertical) and 640 columns (horizontal). The vertical pixel spacing is typically twice the horizontal pixel spacing, resulting in a 4:3, horizontal to vertical aspect ratio. It is therefore possible to obtain longer streaks or longer spacing between strobed frames if the camera is oriented such that its horizontal dimension is parallel to the steering direction. However, higher angular resolution is obtained with the vertical dimension parallel to the steering direction. So, depending on the expected slip angle, it is possible to orient the camera to improve resolution. In addition, it is possible to use two cameras oriented orthogonal to each other to improve the accuracy of the measured slip angle.

Other embodiments of the invention will be apparent to those skilled in the art from consideration of the specification and practice of the invention disclosed herein.

What is claimed is:

1. A process for determining a vehicle dynamic during travel, comprising the steps of:
    monitoring movement in one or more camera images of features in a surface over which a vehicle is traveling; and
    analyzing the movement to determine at least one vehicle dynamic by analyzing the texture of the features in a single camera frame image, wherein the texture analysis comprises:
        identifying edges or points of high image intensity gradient in the camera frame image;
        calculating the orientation of an edge segment associated with the edges or points of high image intensity gradient; and
        determining a dominant orientation of the edge segments.

2. The process of claim 1, wherein the analysis determines the direction of vehicle movement.

3. The process of claim 2, wherein the analysis determines the speed of the vehicle.

4. The process of claim 1, wherein the step of monitoring is performed with a camera mounted such that the camera maintains alignment with a wheel of the vehicle.

5. The process of claim 1, at least, two cameras are mounted to the vehicle to monitor the movement of the features.

6. The process of claim 1, wherein the at least one vehicle dynamic includes slip angle.

7. The process of claim 1, further comprising the step of monitoring steering angle.

8. The process of claim 1, wherein the step of analyzing further comprises:
    calculating the angle of vehicle motion; and
    determining slip angle from the angle of vehicle motion.

9. A process for determining a vehicle dynamic during travel, comprising the steps of:
    monitoring movement in one or more camera images of features in a surface over which a vehicle is traveling; and analyzing the movement to determine at least one vehicle dynamic by analyzing the texture of the features in a single camera frame image, wherein the camera shutter speed, $t_s$, falls within the range $$\frac{l}{2v} < t_s < \frac{l}{v},$$

where l is the field of view of the camera in a steering direction of the vehicle and v is vehicle velocity.

10. A process for determining a vehicle dynamic during travel, comprising the steps of:
monitoring movement in a plurality of consecutive camera images of features in a surface over which a vehicle is traveling; and
analyzing the movement to determine at least one vehicle dynamic, wherein the step of monitoring movement comprises monitoring individual features of the surface in at least two consecutive camera frame images, and wherein the camera is operated at a shutter speed of less than $$\frac{l}{vn},$$

where l is the field of view in a steering direction of the vehicle, n is the number of pixels in the image plane along the steering direction, and v is the speed of the vehicle.

11. The process of claim 10, wherein the step of analyzing comprises:
matching individual features in the at least two consecutive images;
determining motion vectors for the matched features; and
determining a dominant motion vector.

12. The process of claim 11, wherein the step of analyzing further comprises:
calculating the angle of vehicle motion; and
determining slip angle from the angle of vehicle motion and a reference angle.

13. A process for determining a vehicle dynamic during travel, comprising the steps of:
monitoring movement in one or more camera images of features in a surface over which a vehicle is traveling; and
analyzing the movement to determine at least one vehicle dynamic, wherein the step of monitoring movement is performed with at least one strobe light in combination with a camera such that at least two strobe flashes are performed during a single camera frame exposure, and wherein the strobe flashes are separated by a period ranging from $$\frac{0.25l}{v} \text{ to } \frac{0.75l}{v},$$

and the camera is operated at a shutter speed ranging from $$\frac{0.3l}{v} \text{ to } \frac{0.8l}{v},$$

where l is the field of view in a steering direction of the vehicle and v is the speed of the vehicle.

14. The process of claim 13 wherein the step of analyzing comprises:
matching individual features within the single camera frame image;
determining motion vectors for the matched features; and
determining a dominant motion vector.

15. The process of claim 14, wherein the step of analyzing further comprises:
calculating the angle of vehicle motion; and
determining slip angle from the angle of vehicle motion and a reference angle.

16. A vehicle comprising an apparatus for determining a vehicle dynamic during travel, wherein the apparatus is capable of monitoring movement in one or more camera images of features in a surface over which a vehicle is traveling, and analyzing the movement to determine at least one vehicle dynamic by analyzing the texture of the features in a single camera frame image, wherein the texture analysis comprises:
identifying edges or points of high image intensity gradient in the camera frame image;
calculating the orientation of an edge segment associated with the edges or points of high image intensity gradient; and
determining a dominant orientation of the edge segments.

17. The vehicle of claim 16, wherein the step of monitoring movement is performed with at least one strobe light in combination with a camera such that at least two strobe flashes are performed during a single camera frame exposure.

18. The vehicle of claim 17, wherein the step of analyzing further comprises:
matching individual features within the single camera frame image;
determining motion vectors for the matched features; and
determining a dominant motion vector.

19. A vehicle comprising an apparatus for determining a vehicle dynamic during travel, wherein the apparatus includes a camera and is capable of monitoring movement in a plurality of consecutive camera images of features in a surface over which a vehicle is traveling, and of analyzing the movement to determine at least one vehicle dynamic, wherein the step of monitoring movement comprises monitoring individual features of the surface in at least two of the consecutive camera frame images, and wherein the camera is operated at a shutter speed of less than $$\frac{l}{vn},$$

where l is the field of view in a steering direction of the vehicle, n is the number of pixels in the image plane along the steering direction, and v is the speed of the vehicle.

20. The vehicle of claim 19, wherein the step of analyzing comprises:
matching individual features in the at least two consecutive images;
determining motion vectors for the matched features; and
determining a dominant motion vector.

* * * * *